United States Patent
Sakaida

(10) Patent No.: US 8,749,697 B2
(45) Date of Patent: Jun. 10, 2014

(54) IMAGE CAPTURING APPARATUS AND CONTROL METHOD THEREOF

(75) Inventor: Minoru Sakaida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 13/352,945

(22) Filed: Jan. 18, 2012

(65) Prior Publication Data

US 2012/0194721 A1    Aug. 2, 2012

(30) Foreign Application Priority Data

Jan. 27, 2011    (JP) ................................. 2011-015706

(51) Int. Cl.
*H04N 5/232* (2006.01)

(52) U.S. Cl.
USPC ........................................................ 348/350

(58) Field of Classification Search
USPC ......................................... 348/345, 349, 350
See application file for complete search history.

(56) References Cited

U.S. PATENT DOCUMENTS

| | | | | |
|---|---|---|---|---|
| 7,812,881 | B2 * | 10/2010 | Kusaka | 348/350 |
| 2009/0086063 | A1 * | 4/2009 | Suzuki et al. | 348/241 |
| 2011/0013898 | A1 * | 1/2011 | Kanai | 396/114 |
| 2012/0133821 | A1 * | 5/2012 | Takaiwa | 348/345 |

FOREIGN PATENT DOCUMENTS

JP    2007-325139    12/2007

* cited by examiner

*Primary Examiner* — Timothy J Henn
(74) *Attorney, Agent, or Firm* — Cowan, Liebowitz & Latman, P.C.

(57) ABSTRACT

An image capturing apparatus comprises: an image sensor having multiple segmental pixels each including multiple photoelectric conversion units arranged two-dimensionally for receiving light beams that have passed through different pupil regions, the photoelectric conversion units being divided for each segmental pixel in a first or second pupil-division direction for addition reading; a determination unit configured to determine an edge direction of an image for each divided area of the image sensor; a decision unit configured to, based on the determined edge direction, decide for each divided area either the first or second pupil-division direction; a reading control unit configured to perform addition reading of the segmental pixels by dividing the photoelectric conversion units in the first or second pupil-division direction decided, and to control the image sensor such that pairs of image signals are outputted; and a focus adjusting unit configured to carry out phase difference focus adjustments.

12 Claims, 13 Drawing Sheets

IMAGE CAPTURING APPARATUS AND CONTROL METHOD THEREOF

BACKGROUND OF THE INVENTION

1. Field of the Invention

The present invention relates to image capturing apparatuses and control methods thereof, and particularly relates to image capturing apparatuses and control methods thereof that enable a pair of signals based on light beams that have passed through different pupil regions of an optical system to be read out from at least part of pixels.

2. Description of the Related Art

Heretofore technologies have been known that achieve a focus detection function and image signal obtainment using a single image sensor, and as one example thereof, a technology has been proposed (for example, see Japanese Patent Laid-Open No. 2007-325139) in which pixels used for obtaining information for focus detection can also be used as image-obtaining pixels for obtaining image signals. According to this technology, pixels for obtaining information are divided into four in the horizontal and vertical directions and, when obtaining an image, the signals of the region divided into four are all added to obtain an image signal. Furthermore, when performing a focus adjustment, by adding the signals by two regions of the four divided regions in the horizontal or vertical directions, it is possible to perform pupil-division within the pixel and use thus obtained signals for focus adjustments of a phase difference method.

However, in the configuration described in Japanese Patent Laid-Open No. 2007-325139, when performing a focus adjustment, a region that has been divided into two either vertically or laterally within the region divided into four undergoes addition processing and is read out. For this reason, in a case where division into two has been performed laterally for example, phase differences are less apparent when the main subject targeted for focusing is a horizontal line or a diagonal line having a shallow angle, and sometimes appropriate phase difference method focus adjustments cannot be carried out on the main subject.

SUMMARY OF THE INVENTION

The present invention has been made in consideration of the above situation, and improves the accuracy of focus adjustments while keeping a light system load in image capturing apparatuses that use image sensors having multiple pixels, each including multiple photoelectric conversion units, in which the pupil-division direction is switchable.

According to the present invention, provided is an image capturing apparatus, comprising: an image sensor having multiple segmental pixels each of which includes multiple photoelectric conversion units arranged two-dimensionally for receiving light beams that have passed through different regions of an exit pupil of an optical system, and in which the photoelectric conversion units are divided for each segmental pixel in a first pupil-division direction or a second pupil-division direction perpendicular to the first pupil-division direction such that addition reading can be performed on generated charges; a determination unit configured to, based on an image signal of each pixel obtained from the charge/charges that has/have been read out from the image sensor, determine an edge direction of an image for each divided area of the image sensor divided into multiple areas; a decision unit configured to, based on the edge direction that has been determined for each divided area by the determination unit, decide for each divided area either the first pupil-division direction or the second pupil-division direction; a reading control unit configured to perform addition reading of each of the segmental pixels by dividing the photoelectric conversion units in the first pupil-division direction or the second pupil-division direction decided, and to control the image sensor such that pairs of image signals are outputted; and a focus adjusting unit configured to carry out focus adjustments based on a phase difference of the pair of image signals outputted from each of the segmental pixels according to control by the reading control unit.

According to the present invention, provided is a control method for an image capturing apparatus provided with an image sensor having multiple segmental pixels each of which includes multiple photoelectric conversion units arranged two-dimensionally for receiving light beams that have passed through different regions of an exit pupil of an optical system, and in which the photoelectric conversion units are divided for each segmental pixel in a first pupil-division direction or a second pupil-division direction perpendicular to the first pupil-division direction such that addition reading can be performed on generated charges, the method comprising: determining, based on an image signal of each pixel obtained from the charge/charges that has/have been read out from the image sensor, an edge direction of an image for each divided area of the image sensor divided into multiple areas; deciding, based on the edge direction that has been determined for each divided area in the determination, for each divided area either the first pupil-division direction or the second pupil-division direction; performing addition reading of each of the segmental pixels by dividing the photoelectric conversion units in the first pupil-division direction or the second pupil-division direction decided in the deciding, and controlling the image sensor such that pairs of image signals are outputted; and carrying out focus adjustments using a focus adjusting unit based on a phase difference of the pair of image signals outputted from each of the segmental pixels according to control by the reading control.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

Figure 1:
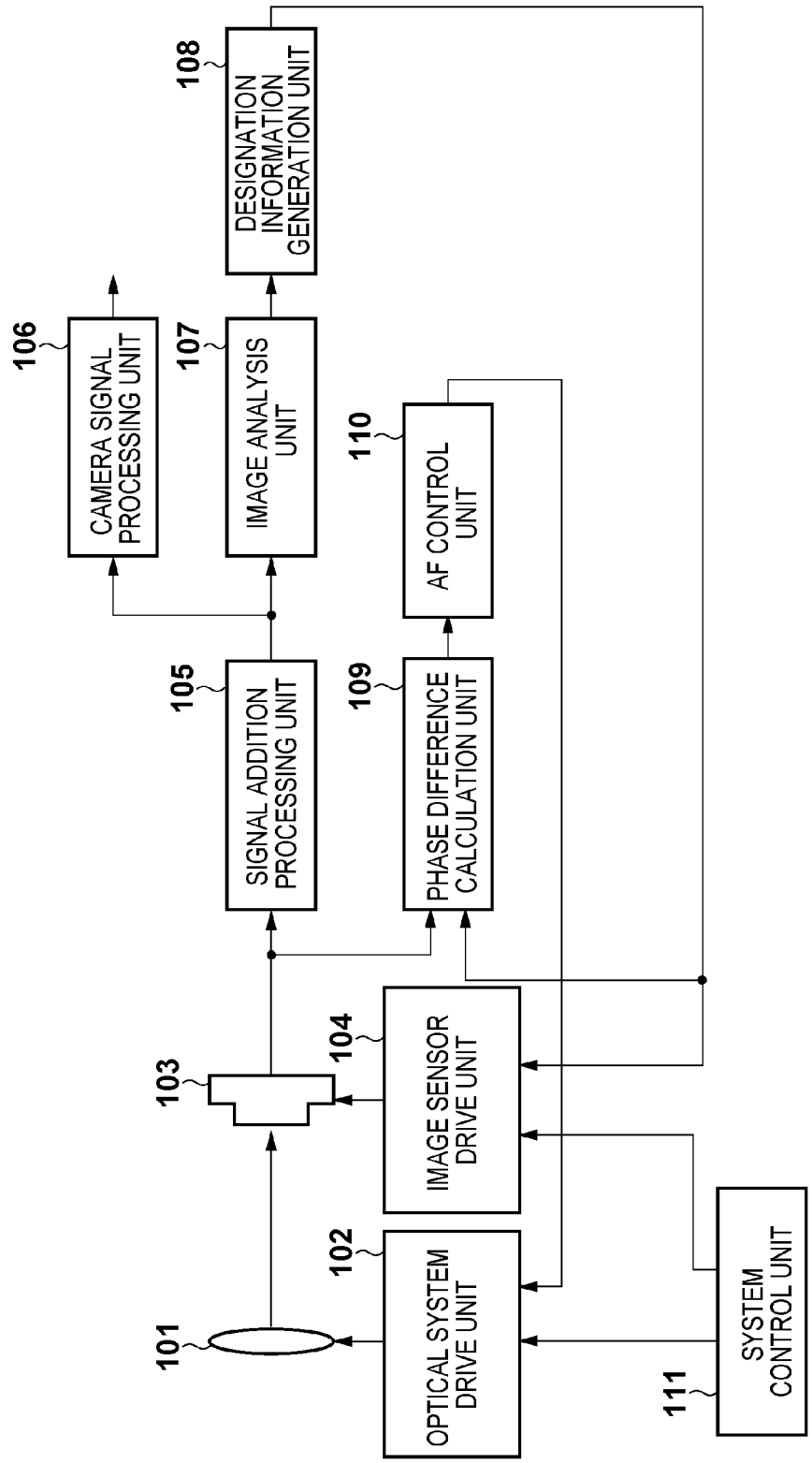
FIG. 1 is a block diagram showing a brief configuration of an image capturing apparatus according to an embodiment of the present invention.

FIG. 1 is a block diagram showing an outline configuration of an image capturing apparatus according to an embodiment of the present invention. In FIG. 1, an optical system 101 is constituted by at least one or more of a zoom lens, an aperture, and a focus lens. An optical system drive unit 102 controls the optical system 101 in response to information such as focus information outputted from an AF control unit 110, which will be described later, or optical system drive information from a system control unit 111, which will be described later. An image sensor 103 converts a subject image to electrical signals by photoelectric conversion, and outputs these as image signals. As will be described later, in the present embodiment, each pixel has multiple photodiodes (photoelectric conversion units), each of which receives light beams that have passed through different regions of an exit pupil of the optical system 101, and outputs pupil-divided image signals as will be described later. It should be noted that a configuration of the image sensor 103 is described in detail with reference to FIGS. 2 and 3. An image sensor drive unit 104 controls the image sensor 103 in response to information such as pupil-division designation information of each pixel outputted from a designation information generation unit 108, which will be described later, and image sensor drive information from the system control unit 111. It should be noted that, through a so-called electric shutter function of the image sensor 103, the image sensor drive unit 104 can control the image sensor so as to achieve a required exposure time using a control signal.

A signal addition processing unit 105 adds pupil-divided image signals outputted from the image sensor 103 by pixel, and generates an added image signal for display/recording. A camera signal processing unit 106 carries out, for example, commonly known image processing such as color conversion, white balance and gamma corrections, as well as image processing such as resolution conversion processing and image compression processing on the added image signals obtained from the signal addition processing unit 105, and generates video signals for display/recording. An image analysis unit 107 generates subject information to be sent to the designation information generation unit 108 from the added image signals obtained from the signal addition processing unit 105. Based on the subject information obtained by the image analysis unit 107, the designation information generation unit 108 generates pupil-division designation information that indicates pupil-division directions for each pixel of the image sensor 103.

A phase difference calculation unit 109 calculates a phase difference evaluation value for carrying out phase difference focus adjustments from the pupil-divided image signals outputted from the image sensor 103. The AF control unit 110 calculates focus information for controlling the focus lens position of the optical system 101 based on the phase difference evaluation values calculated by the phase difference calculation unit 109.

The system control unit 111 performs overall control of the image capturing apparatus. Based on image capture information obtained from user instructions, image capture scene detection, subject detection and the like, the system control unit 111 sends drive information for the optical system 101 such as zoom and aperture to the optical system drive unit 102, and sends drive information for the image sensor 103 such as exposure time or the like to the image sensor drive unit 104.

Figure 2:
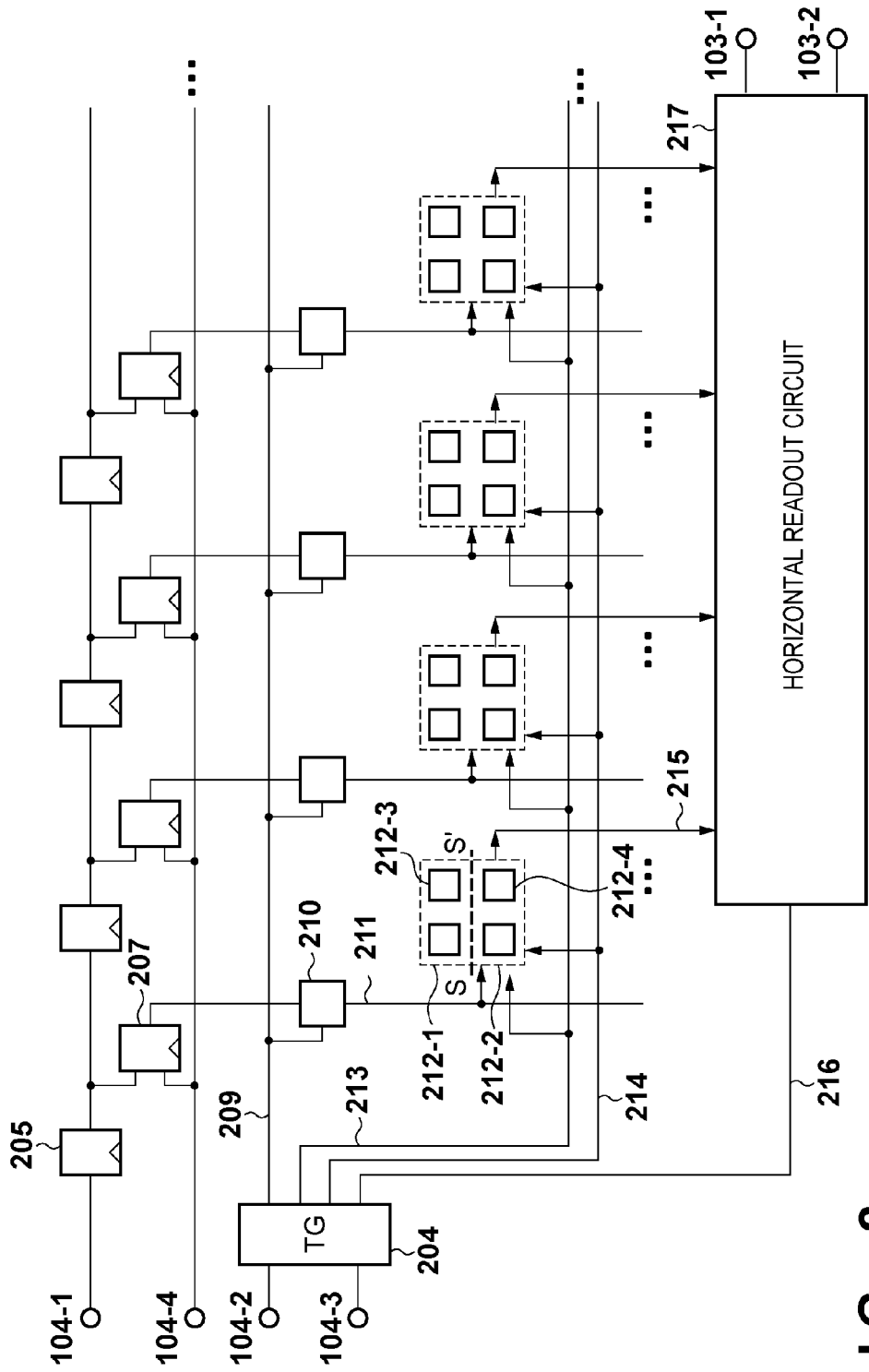
FIG. 2 is a diagram showing one example of a configuration of an image sensor.

FIG. 2 is a diagram showing one example of a circuit configuration of the image sensor 103 shown in FIG. 1. Each pixel of the image sensor 103 is constituted having a total of four photodiodes (two horizontal and two vertical) that share a single microlens. Hereinafter, this pixel constituted by four photodiodes is referred to as a segmental pixel. To simplify description, FIG. 2 shows only the structure of four segmental pixels at a top left edge, but in fact a multitude of segmental pixels are arranged two-dimensionally.

In FIG. 2, a pupil-division direction designation input 104-1, a horizontal synchronizing signal (HD) input 104-2, a vertical synchronizing signal (VD) input 104-3, and a designation information updating signal input 104-4 are outputted from the image sensor drive unit 104. Reference numeral 204 denotes a timing signal generation circuit (TG); 205, a first buffer; 207, a second buffer; 209, a pixel readout shared control signal bus; and 210, a pixel readout control modification circuit.

Reference numeral 211 denotes a pixel readout control signal bus. Furthermore, a segmental pixel 212 is constituted by four photodiodes that share a microlens, in which reference numeral 212-1 denotes a first photodiode; 212-2, a second photodiode; 212-3, a third photodiode; and 212-4, a fourth photodiode. And the pixel readout control signal bus 211 provides four control signals constituted by first to fourth readout control signals 211-1, 211-2, 211-3, and 211-4, which control the readout of the first to fourth photodiodes 212-1 to 212-4 of each of the segmental pixels 212.

Furthermore, reference numeral 213 denotes a row readout control signal line for the segmental pixel 212; 214, a reset signal line; 215, a column readout line; 216, a horizontal drive control signal line; 217, a horizontal readout circuit; 103-1, a first output terminal; and 103-2, a second output terminal.

Figure 3:
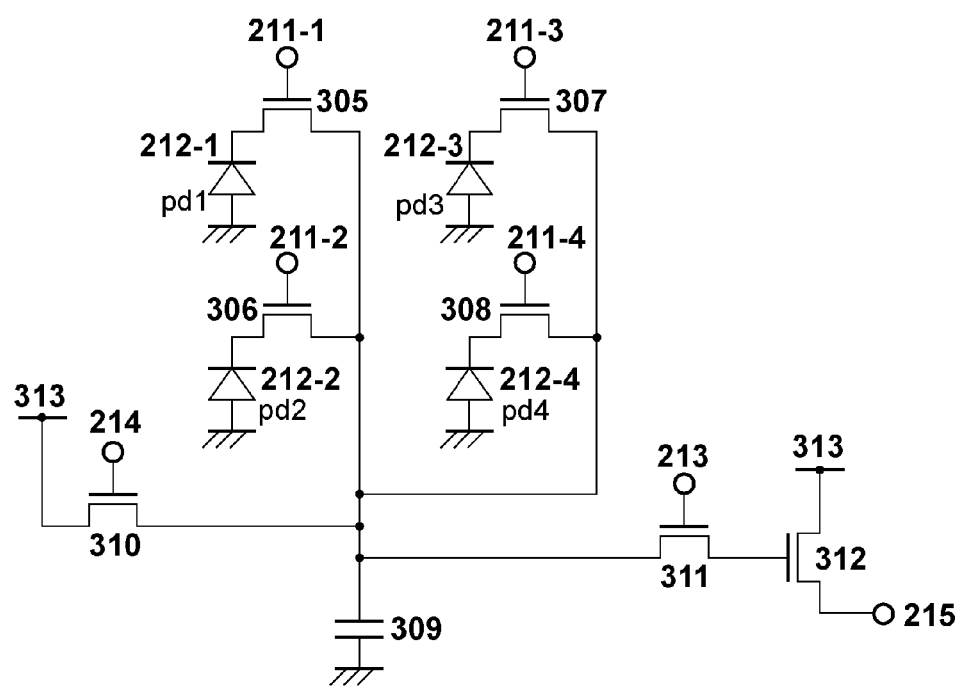
FIG. 3 is a diagram showing one example of a configuration of a segmental pixel.

FIG. 3 shows a circuit configuration example of the segmental pixels 212 shown in FIG. 2. In FIG. 3, reference numeral 305 denotes a first pixel readout transistor; 306, a second pixel readout transistor; 307, a third pixel readout transistor; 308, a fourth pixel readout transistor; 309, a floating diffusion unit; 310, a pixel reset transistor; 311, a row readout transistor; 312, a pixel source follower; and 313, a power supply line.

Figure 4A:
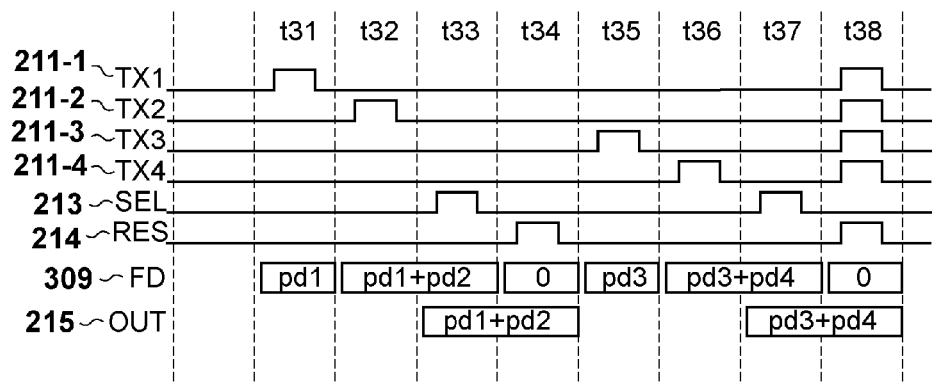
FIGS. 4A and 4B are drive timing charts for describing an addition procedure for photodiodes of segmental pixels.
Figure 4B:
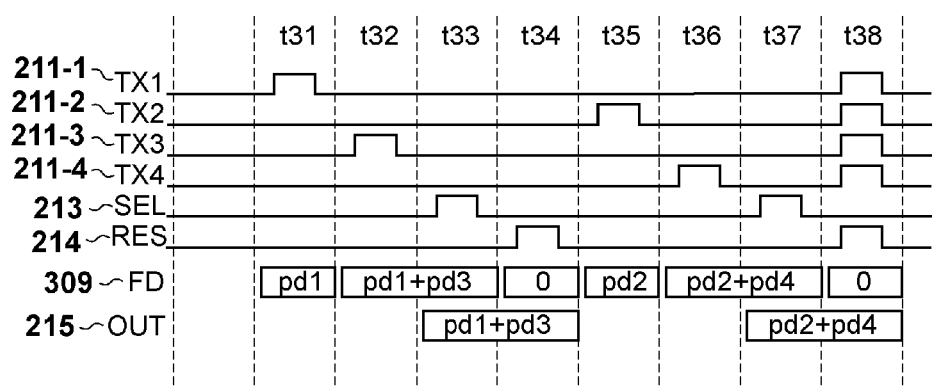

Here, description is given of with reference to FIGS. 4A and 4B regarding a procedure of addition reading of the segmental pixel 212 having the above-described configuration. The timing chart shown in FIG. 4A is a diagram for describing drive control of the segmental pixel 212 in a case where pupil-division is performed in the horizontal direction.

First, in periods t31 and t32, the first readout control signal 211-1 and the second readout control signal 211-2 are sequentially set to high. Due to this, the first pixel readout transistor 305 and the second pixel readout transistor 306 sequentially become conduction state. As a result, the charges accumulated in the first photodiode 212-1 and the second photodiode 212-2 are collected sequentially in the floating diffusion unit 309 and the charges are added.

Next, in a period t33, the row readout control signal line 213 is set to high. Due to this, the row readout transistor 311 becomes conduction state, the added charges collected in the floating diffusion unit 309 by the pixel source follower 312 are converted into a voltage, and outputted via the column readout line 215.

Next, in a period t34, the pixel reset control signal 214 is set to high. Due to this, the pixel reset transistor 310 becomes conduction state, and the charge of the floating diffusion unit 309 is reset to zero.

Then, in periods t35 and t36, the third readout control signal 211-3 and the fourth readout control signal 211-4 are set in order to high. Due to this, the third pixel readout transistor 307 and the fourth pixel readout transistor 308 sequentially become conduction state. As a result, the charges accumulated in the third photodiode 212-3 and the fourth photodiode 212-4 are collected sequentially in the floating diffusion unit 309 and the charges are added.

Next, in a period t37, due to the row readout control signal line 213 being set to high in a same manner as in the period t33, the added charges collected in the floating diffusion unit 309 are converted to a voltage, and outputted via the column readout line 215.

Finally, in a period t38, the pixel reset control signal 214 and all the pixel readout control signals are set to high. Due to this, the pixel reset transistor 310 and all the pixel readout transistors become conduction state such the accumulated charges of all the photodiodes and the floating diffusion unit 309 are all reset to zero, and the accumulation of photo charges is carried out again for the next readout drive.

By carrying out addition reading as described above, image signals are read out of left and right pupil-divided images in the horizontal direction.

FIG. 4B is a timing chart of drive control of the segmental pixel 212 in a case where pupil-division is performed in the vertical direction.

It should be noted in regard to the operations of FIG. 4B, that only the combinations in which the first to fourth pixel readout control signals 211-1 to 211-4 are set to high in the periods t31, t32, t35, and t36 are different from the timing chart of FIG. 4A. Thus, detailed description of FIG. 4B is omitted. The differences from the operations shown in FIG. 4A are that in FIG. 4B, in the periods t31 and t32, the first readout control signal 211-1 and the third readout control signal 211-3 are sequentially set to high. And also that in the periods t35 and t36, the second readout control signal 211-2 and the fourth readout control signal 211-4 are sequentially set to high.

By carrying out addition reading as described above, image signals are read out of upper and lower pupil-divided images in the vertical direction.

The added charges that have undergone voltage conversion are inputted to the horizontal readout circuit 217. The horizontal readout circuit 217 according to the present embodiment can be driven so as to read out at the same time a pixel signal that has been read out first and a pixel signal that has been read out after. Accordingly, a left signal or an upper signal is outputted in order from the first output terminal 103-1, and a right signal or a lower signal is outputted in order from the second output terminal 103-2.

Figure 5:
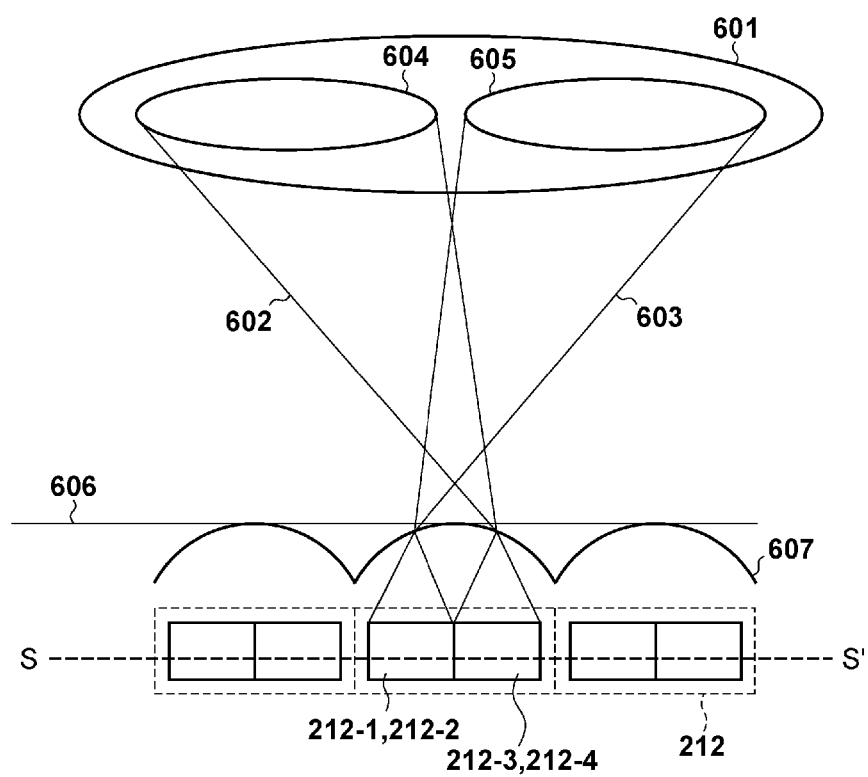
FIG. 5 is a diagram for describing a phase difference principle.

Here, description is given of regarding a calculation method for phase difference evaluation values based on the image signals. FIG. 5 schematically shows a cross section between S and S' of FIG. 2. Reference numeral 601 denotes an exit pupil of an imaging lens seen from an image side. The distance from an image forming surface 606 of the imaging lens to the exit pupil 601 in the in-focus state is called an exit pupil position, and this position varies according to such factors as the curvature and positional relationship of the lens group, behind (on the image forming surface side of) the unshown aperture of the lens, with the aperture. Naturally the size of the exit pupil also varies according to the width of the aperture. Reference numerals 604 and 605 respectively denote the exit pupils of the first and second photodiodes 212-1 and 212-2 and the third and fourth photodiodes 212-3 and 212-4, which are projected on the exit pupil position by the microlens 607. This is designed so that light beams 603 that pass through the exit pupil 605 are incident on the first and second photodiodes 212-1 and 212-2, and so that light beams 602 that pass through the exit pupil 604 are incident on the third and fourth photodiodes 212-3 and 212-4. Furthermore, the same design is implemented in regard to the other segmental pixels that constitute the image sensor 103, and an image as seen from a region of the right side 605 of the exit pupil 601 of the imaging lens is obtained from the first and second photodiodes 212-1 and 212-2 of each of the segmental pixels. Similarly, an image as seen from a region of the left side 604 of the exit pupil 601 of the imaging lens is obtained from the third and fourth photodiodes 212-3 and 212-4 of each of the segmental pixels. When the image obtained on the image sensor 103 by the light beams 602 is given as A image and the image obtained on the image sensor 103 by the light beams 603 is given as B image, then depending on the focused state, signals including parallax in the image signals can be obtained.

Figure 6:
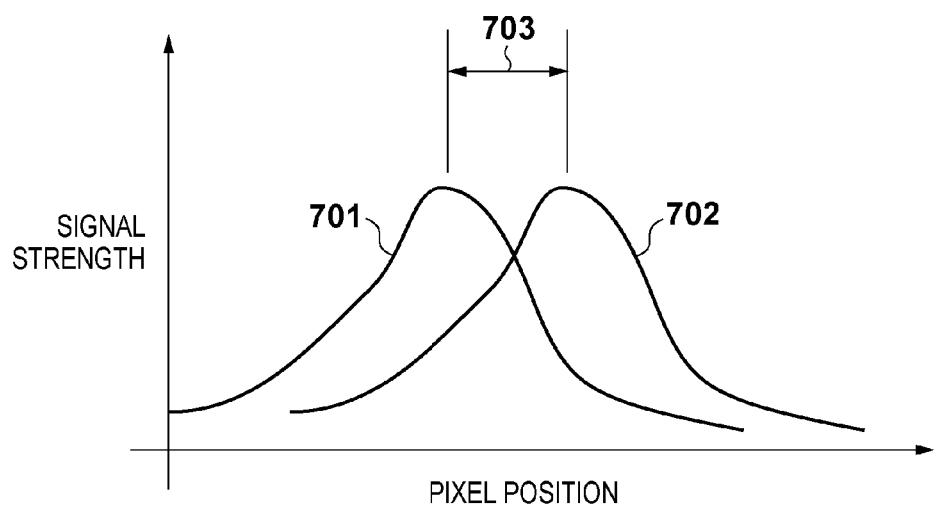
FIG. 6 is a diagram for describing a principle of focus adjustment processing of a phase difference method.

FIG. 6 shows an image obtained by the third and fourth photodiodes 212-3 and 212-4 as an A image 702, and an image obtained by the first and second photodiodes 212-1 and 212-2 as a B image 701 as one example of image signals in a pre-focused state. Information of distance to a subject using a phase difference detection method is calculated from a relative relationship between the A image 702 and the B image 701 and a distance 703 between the images, and the distance from the image forming surface to the exit pupil at the focus position thereof. The phase difference calculation unit 109 sends information of distance to the subject to the AF control unit 110 as a calculated phase difference evaluation value.

Based on the phase difference evaluation value from the phase difference calculation unit 109, the AF control unit 110 decides a target focus position and sends a movement direction and a movement amount from the current focus position to the optical system drive unit 102 as focus information.

It should be noted that in the foregoing description, a case was shown where the phase difference evaluation value is calculated from image signals (right image and left image) that have been read out by pupil-division in the horizontal direction, but the same is achievable for image signals (upper image and lower image) that have been read out by pupil-division in the vertical direction, and therefore description thereof is omitted.

Next, description is given of regarding a method for generating pupil-division direction designation information according to the present embodiment. In the image capturing apparatus according to the present embodiment, image signals outputted from the image sensor 103 are segmented into multiple divided areas, and a pupil-division direction of the segmental pixels is decided for each of the divided areas that have been segmented.

The image analysis unit 107 carries out image analysis on the added image signals outputted from the signal addition processing unit 105 and generates subject information to be inputted to the designation information generation unit 108.

Figure 7:
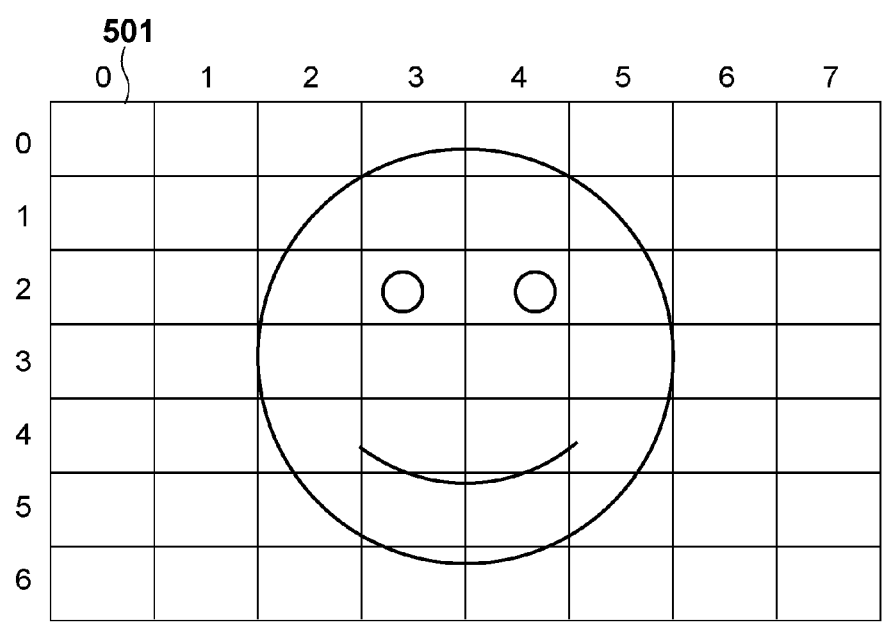
FIG. 7 is a diagram showing divided areas.

As shown in FIG. 7, subject information in the present embodiment refers to information of edge directions in an image of a subject in each of the divided areas 501 that has been segmented to a predetermined size. The divided areas are identified by a divided area address (i, j), and in the example shown in FIG. 7, "i" takes an integer from 0 to 7, and "j" takes an integer from 0 to 6. With an address (x, y) of the added image signal, the following relational equations (1) hold. It should be noted that i and x are a horizontal direction address, and j and y are a vertical direction address.

$$x = i \times HSIZE + x'$$

$$y = j \times VSIZE + y' \quad (1)$$

Here, x' and y' are the horizontal direction and vertical direction addresses of the added image signals in each of the divided areas, and HSIZE and VSIZE indicate the horizontal direction and vertical direction sizes of the divided area.

The divided area address (i, j) and the added image signal address (x, y) are inputted together to the image analysis unit 107. First, description is given of regarding a generation method for subject information (information of edge direction in an image of the subject) for each divided area by the image analysis unit 107.

Figure 8:
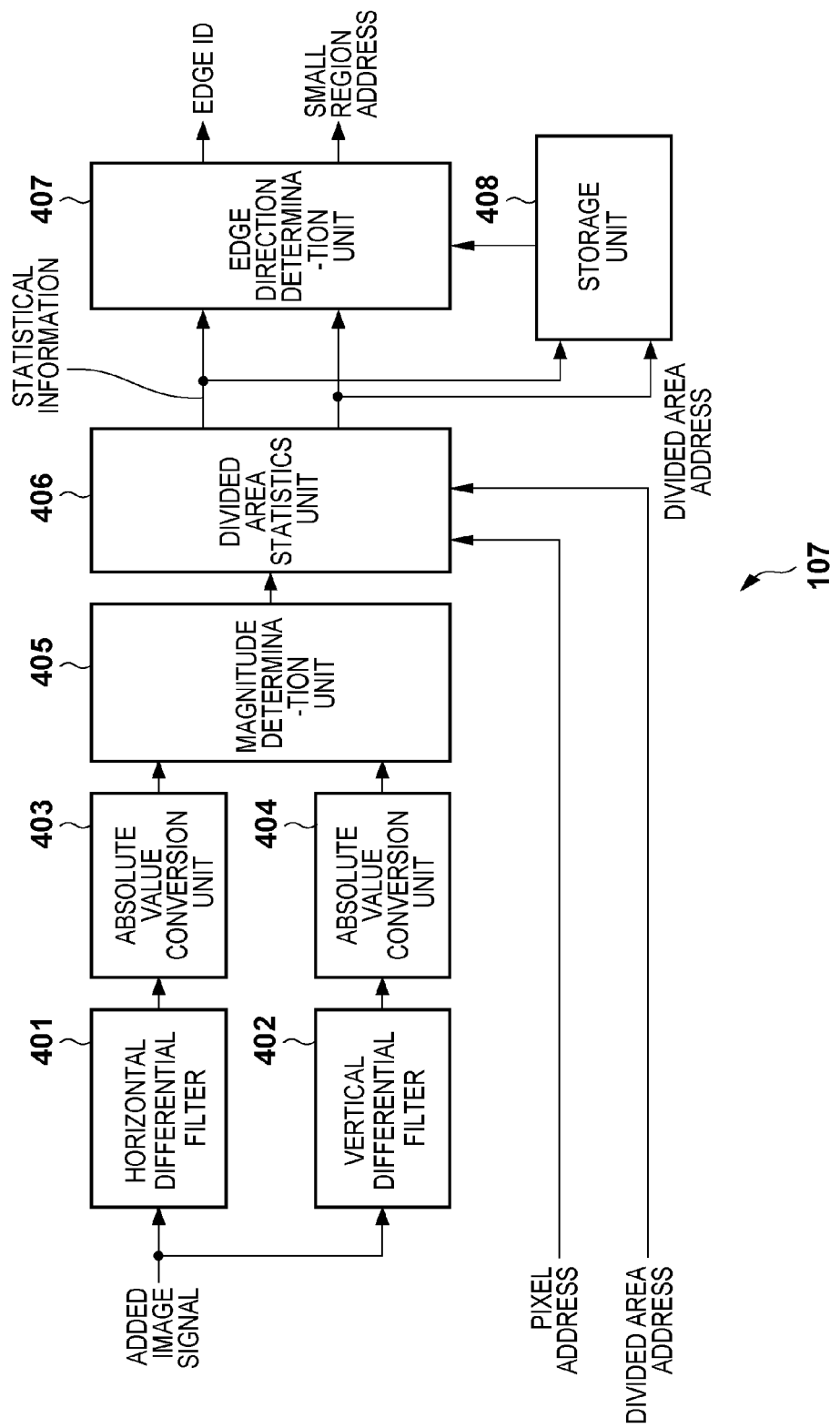
FIG. 8 is a block diagram showing one example of a configuration of an image analysis unit.

FIG. 8 is a block diagram showing a configuration of the image analysis unit 107. In FIG. 8, a horizontal differential filter 401 calculates a gradient value of the horizontal direction from the added image signals generated by the signal addition processing unit 105, and an absolute value conversion unit 403 converts the horizontal direction gradient value to an absolute value. A vertical differential filter 402 calculates a gradient value of the vertical direction from the added image signals, and an absolute value conversion unit 404 converts the vertical direction gradient value to an absolute value.

A magnitude determination unit 405 carries out a large/small determination between the absolute value of the horizontal direction gradient value and the absolute value of the vertical direction gradient value for each pixel. A divided area statistics unit 406 obtains statistics of large/small determination results for each pixel contained in each of the divided areas. An edge direction determination unit 407 determines an edge direction in the divided area based on statistical information of the divided area and statistical information of its surrounding divided areas. A storage unit 408 stores the statistical information of the divided areas.

Figure 9:
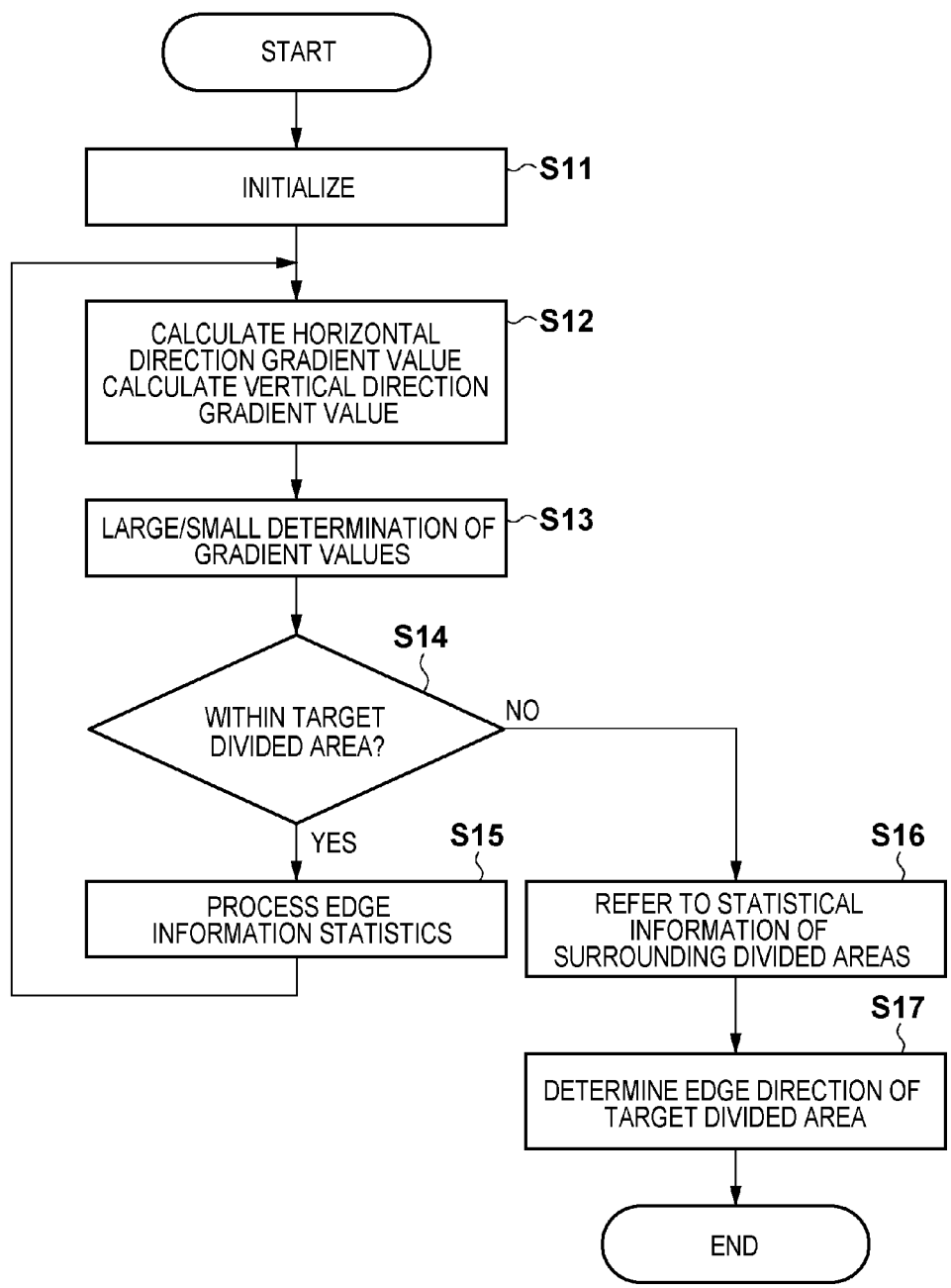
FIG. 9 is a flowchart of image analysis processing for a target divided area.

FIG. 9 is a flowchart showing an edge direction deciding process for a target divided area (i, j) by the image analysis unit 107.

The added image signals are inputted in divided area units and statistical processing is carried out for each divided area, and therefore the process settings are initialized for each divided area unit (step S11). Next, the added image signals are inputted to the horizontal differential filter 401 of the horizontal direction and the vertical differential filter 402 of the vertical direction, and a gradient value is calculated for each added image signal. These differential filters may be constituted by a known Sobel filter, for example. The horizontal direction and vertical direction gradient values for each added image signal are inputted to the absolute value conversion units 403 and 404, respectively, and then converted to absolute values (step S12).

The horizontal direction and vertical direction gradient values of each addition pixel, which have been converted to absolute values, then undergo the large/small determination by the magnitude determination unit 405, and if the absolute value of the horizontal direction gradient value is larger than the absolute value of the vertical direction gradient value, then zero (0) is outputted as the determination information, and if this is not the case, then one (1) is outputted as the determination information (step S13).

The determination information outputted from the magnitude determination unit 405 is inputted to the divided area statistics unit 406. The divided area statistics unit 406 first determines whether or not the determination information is of an added image signal within a target divided area (yes at step S14). The determination information is inputted to the divided area statistics unit 406 at the same time as the address of the added image signals, and therefore if the added image signal address (x, y) is within the target divided area (i, j), then the inputted determination information is considered to be determination information of the target divided area. It should be noted that the determination of whether or not this is within the target area is expressed by the following expression (2).

$$i \times HSIZE \leq x < (i+1) \times HSIZE$$

$$j \times VSIZE \leq y < (j+1) \times VSIZE \quad (2)$$

The divided area statistics unit 406 is constituted by a counter C0 and a counter C1 that count the number of occurrences of zeroes and ones that are the determination information. The counter C0 is incremented by one if the determination information of the input pixel is zero, and the counter C1 is incremented by one if the determination information is one (step S15). When the determination information of the added image signals within the target divided area have all been inputted (no at step S14), the divided area statistics unit 406 outputs the values of the counter C0 and the counter C1 as statistical information. If the statistical information is such that the value of the counter C0 is greater than the value of the counter C1, then this indicates that the horizontal direction gradient of the target divided area is large, that is, that the edge direction is vertical. If it is not the case, then this indicates that the vertical direction gradient of the target divided area is large, that is, that the edge direction is horizontal.

Figure 10A:
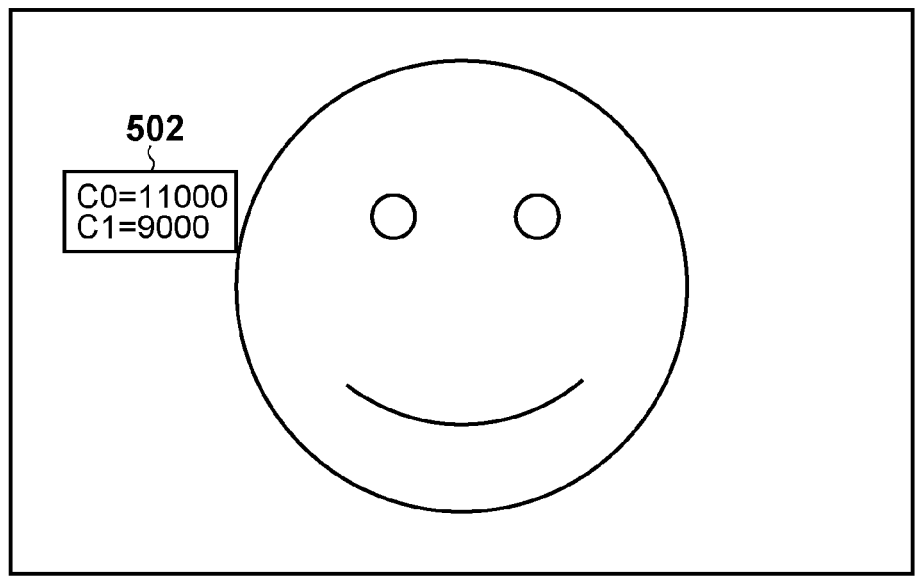
FIGS. 10A and 10B are diagrams showing an example of determining an edge direction of a target divided area based on statistical information from a divided area statistics unit.
Figure 10B:
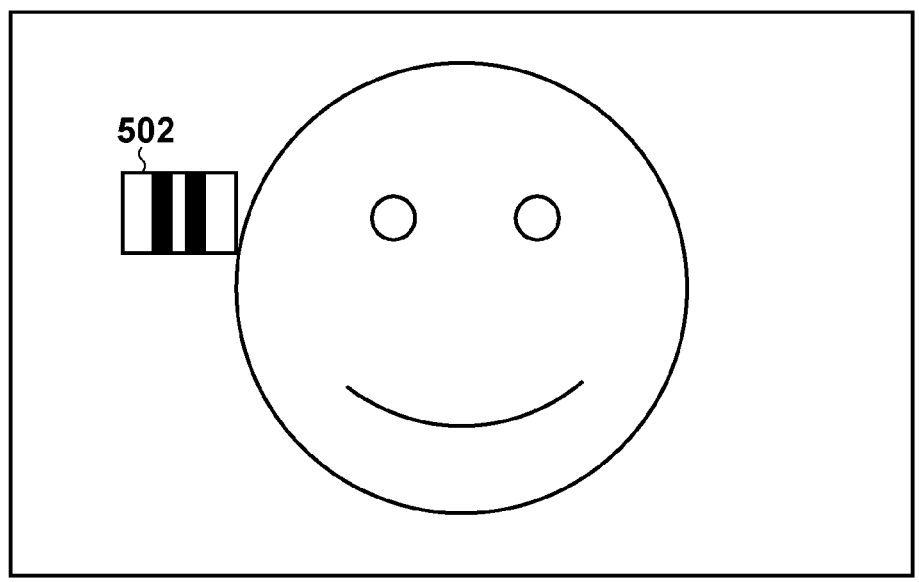

FIG. 10A and FIG. 10B are diagrams showing one example of edge directions estimated from statistical information of a target divided area 502 obtained by the divided area statistics unit 406. FIG. 10A shows statistical information of the target divided area 502, and the value of the counter C0 is greater than the value of the counter C1. In this case, as shown in FIG. 10B, the edge direction of the target divided area 502 is indicated as vertical. However, in the present embodiment, the edge direction of the target divided area is decided not only from statistical information of the target divided area, but by also using statistical information of divided areas surrounding the target divided area.

The statistical information outputted from the divided area statistics unit 406 is inputted to the edge direction determination unit 407 and the storage unit 408. The storage unit 408 is constituted by an SRAM, for example, and holds all statistical information for each divided area. Then, from the inputted target divided area address, statistical information of divided areas of the surrounding eight directions is outputted to the edge direction determination unit 407 (step S16).

The edge direction determination unit 407 uses the statistical information of the target divided area (i, j) and the statistical information of the divided areas of the surrounding eight directions stored in advance in the storage unit 408 to carry out a final edge direction determination of the target divided area (i, j) (step S17). Here, the value C0 (i, j) of the counter C0 of the target divided area (i, j) and the values of the counters C0 of the surrounding divided areas are weighted and synthesized using the following equation (3), and a synthesized value C0' thereof is set as the final horizontal direction gradient information of the target divided area (i, j).

$$C0' = C0(i, j) + \frac{(C0(i-1, j-1) + C0(i, j-1) + C0(i+1, j-1) + C0(i-1, j) + C0(i+1, j) + C0(i-1, j+1) + C0(i, j+1) + C0(i+1, j+1))}{8} \quad (3)$$

Similarly, the value C1 (i, j) of the counter C1 of the target divided area (i, j) and the values of the counters C1 of the surrounding divided areas are weighted and synthesized using the following equation (4), and a synthesized value C1' thereof is set as the final vertical direction gradient information of the target divided area (i, j).

$$C1' = C1(i, j) + \frac{(C1(i-1, j-1) + C1(i, j-1) + C1(i+1, j-1) + C1(i-1, j) + C1(i+1, j) + C1(i-1, j+1) + C1(i, j+1) + C1(i+1, j+1))}{8} \quad (4)$$

Then, a large/small comparison is carried out between the synthesized value C0' and the synthesized value C1', and if the synthesized value C0' is larger than the synthesized value C1', then the edge direction of the target divided area (i, j) is determined to be vertical, and zero is outputted as the subject information. If the merged value C0' is not greater than the merged value C1', then the edge direction is determined to be horizontal, and one is outputted as the subject information (step S17).

Figure 11A:
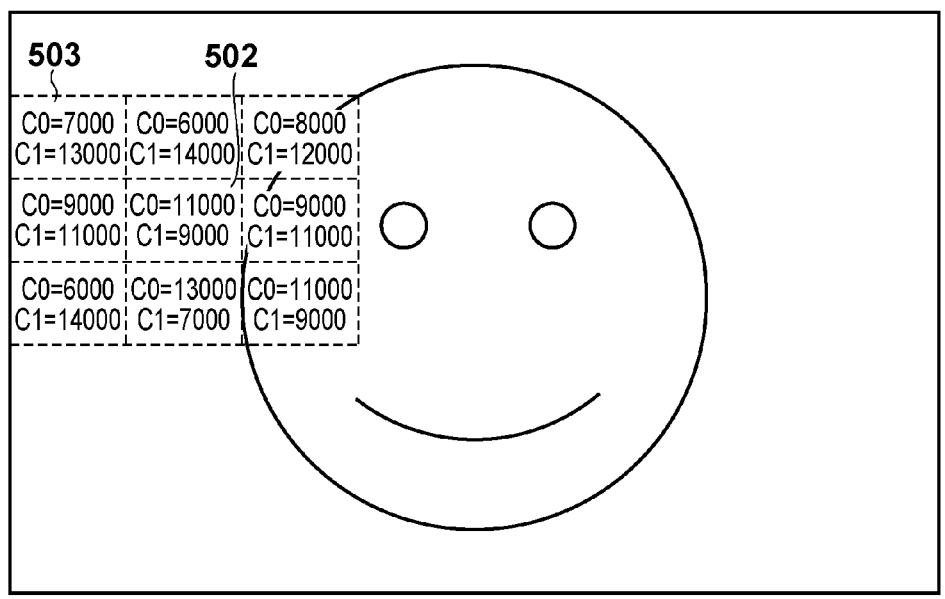
FIGS. 11A and 11B are diagrams for describing a determination method of edge direction in a target divided area by an edge direction determination unit.
Figure 11B:
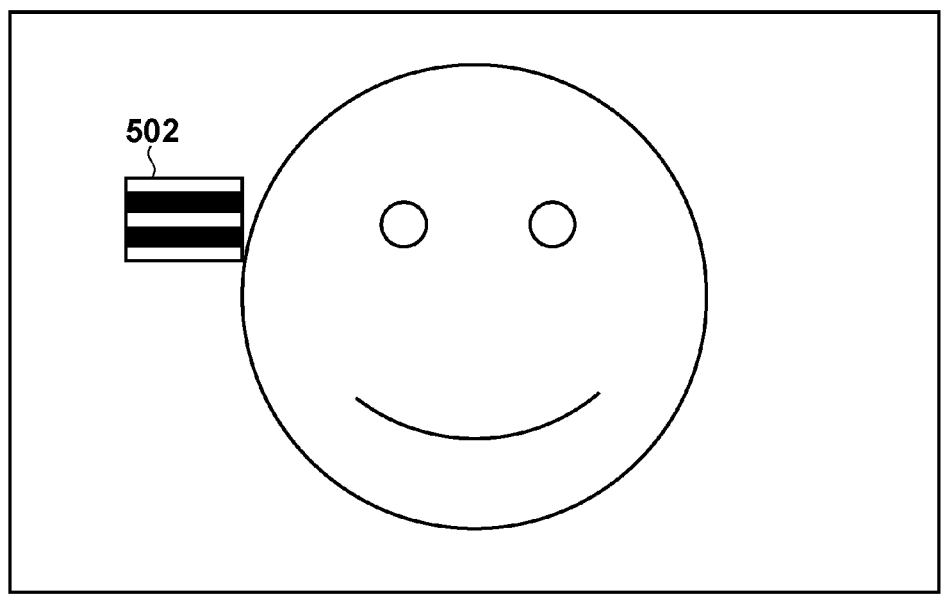

FIGS. 11A and 11B are diagrams showing one example of edge direction decided from statistical information obtained from the target divided area 502 and statistical information of surrounding divided areas 503. FIG. 11A shows statistical information of the target divided area 502 and the surrounding divided area group 503, and when the synthesized values are calculated based on expression (3) and expression (4), the synthesized value C1' is greater than the synthesized value C0'. Thus, as shown in FIG. 11B, from the relationship of the synthesized values, the edge direction determination unit 407 determines that the edge direction of the target divided area 502 is horizontal.

Then, in a case where the subject information outputted from the edge direction determination unit 407 is zero, that is, the edge direction is vertical, the designation information generation unit 108 sets the pupil-division direction of each segmental pixel contained in the corresponding divided area to the horizontal direction. Then zero is outputted as the pupil-division direction designation information. Furthermore, in a case where the subject information outputted from the edge direction determination unit 407 is one, that is, the edge direction is horizontal, the pupil-division direction of each segmental pixel contained in the corresponding divided area is set to the vertical direction. Then one is outputted as the pupil-division direction designation information. In either case, the pupil-division direction of each segmental pixel can be designated by converting the divided area address to an added image signal address.

The pupil-division direction designation information outputted from the designation information generation unit 108 in this manner is inputted to the image sensor drive unit 104 for each row, and inputted to the phase difference calculation unit 109 for each divided area. The pupil-division direction designation information sent to the phase difference calculation unit 109 is for the image signals currently being read, and therefore it is necessary to store the pupil-division designation information of each divided area in a storage unit such as a memory, and to match the timing with the pupil-division direction designation information that is set in the image sensor 103.

It should be noted that in the foregoing example, the edge direction of the target divided area was determined from the edge directions of the target divided area and the surrounding divided areas, but this may be decided based on only the edge direction of the target divided area. In this case, based on the magnitude relationship of the counter C0 and the counter C1 outputted from the divided area statistics unit 406, the edge direction determination unit 407 may decide that the edge direction is either vertical or horizontal.

Figure 12:
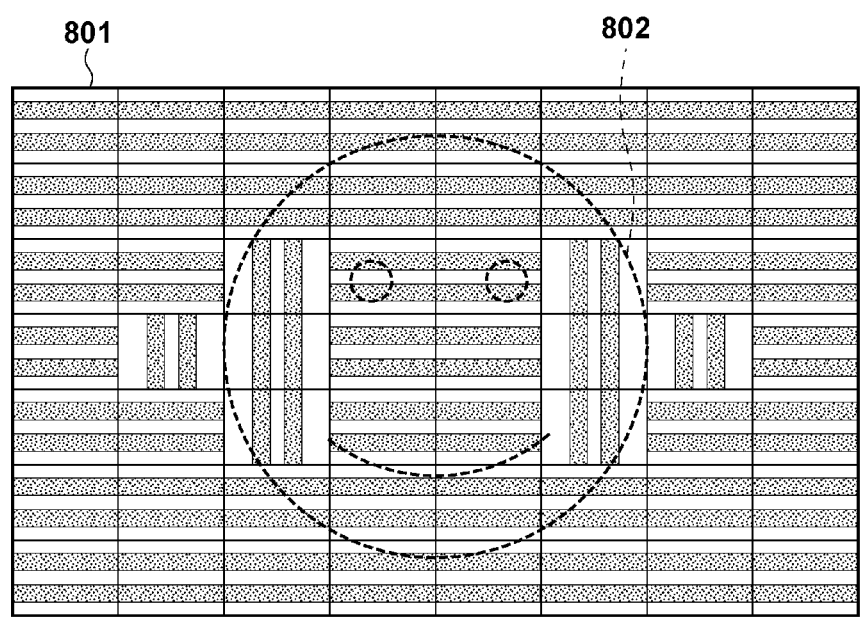
FIG. 12 is a diagram showing one example of edge direction determination results of one frame.

FIG. 12 is a diagram showing one example of a result where edge direction determinations were carried out for all divided areas using added image signals. As described above, the main edge direction of the subject is decided for each divided area and pupil-division can be carried out suited to the edge directions, and therefore very accurate phase difference evaluation values can be obtained, and thus very accurate focus adjustment processing can be carried out.

Figure 13:
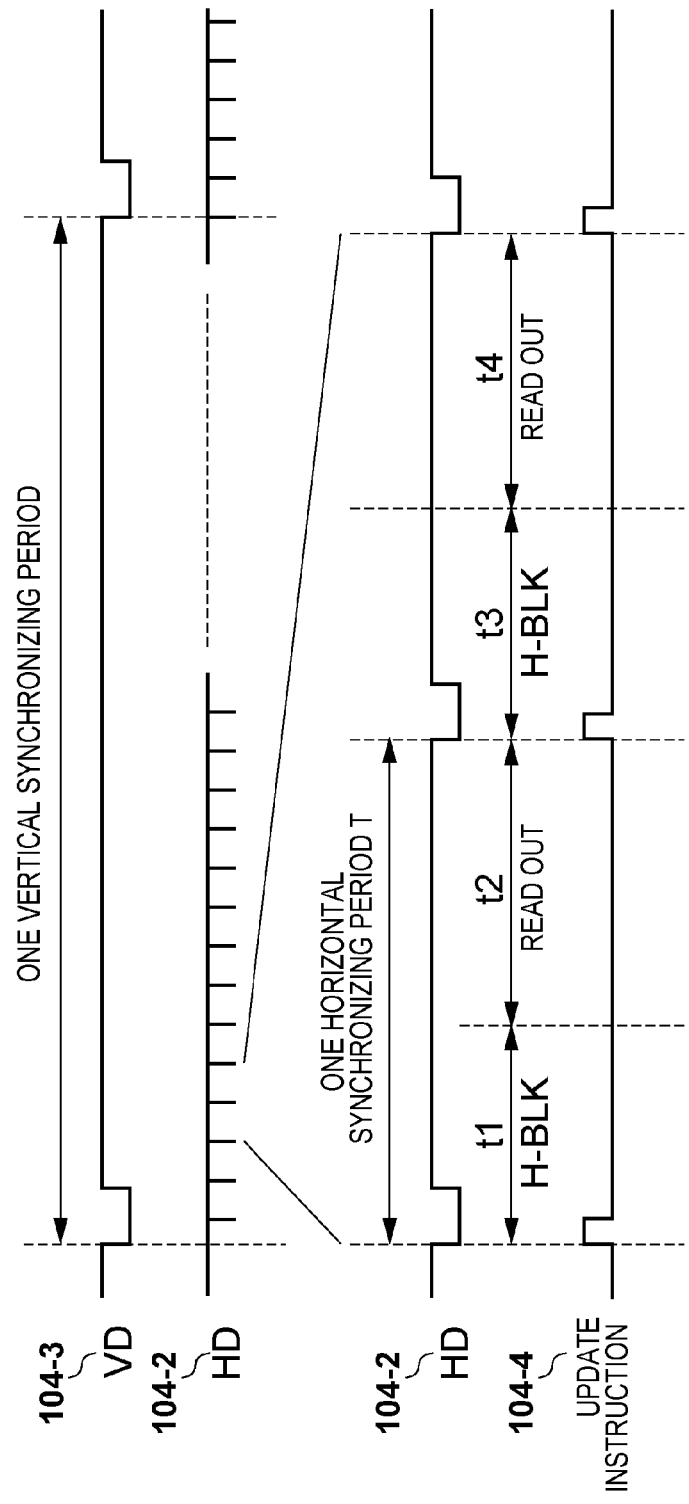
FIG. 13 is a drive timing chart of an image sensor.

Next, description is given of with reference to the timing chart of FIG. 13 regarding the timing of setting the pupil-division designation information obtained in the foregoing manner in the image sensor drive unit 104.

The pupil-division direction designation information of each segmental pixel outputted from the designation information generation unit 108 is inputted as digital signals of zero or one to the pupil-division direction designation input 104-1 shown in FIG. 2. As described earlier, zero designates horizontal direction pupil-division and one designates vertical direction pupil-division.

Pupil-division direction designation information of an nth row is inputted for segmental pixel and held in the first buffer 205 while an image signal of an (n−1)th row is being read out in a horizontal drive period t2. Next, at the beginning of a horizontal blanking period t3 of the nth row shown in FIG. 13, the pupil-division direction designation information is sent to be held in the second buffer 207 according to an update instruction from the designation information updating signal input 104-4. Due to this, the pupil-division direction designation information of one row can be referenced at the same time, and is inputted to the pixel readout control modification circuit 210.

The horizontal synchronizing signal HD and the vertical synchronizing signal VD inputted from the horizontal synchronizing signal input 104-2 and the vertical synchronizing signal input 104-3, respectively, are inputted to the timing signal generation circuit 204. Then, based on these signals, control signals to be sent to the pixel readout shared control signal bus 209 and the row readout control signal line 213 are generated by the timing signal generation circuit 204.

Signals from the pixel readout shared control signal bus 209 become the basis for control signals of the pixel readout control signal bus 211. As shown in FIG. 3, the pixel readout control signal bus 211 is a bus that provides four control signals constituted by the readout control signals 211-1, 211-2, 211-3, and 211-4 of the photodiodes of each of the segmental pixels. These are inputted to the pixel readout control modification circuit 210, which performs an operation in which the control signals of the pixel readout shared control signal bus 209 are modified for each of the pixel readout control modification circuits 210 in accordance with the pupil-division direction designation information of one row. In the present embodiment, in a case where the pupil-division direction designation information is zero (horizontal direction), the signal of the pixel readout shared control signal bus 209 passes as it is, and the readouts from the segmental pixels are controlled such that charge additions are carried out as described in FIG. 3A. On the other hand, in a case where the pupil-division direction designation information is one (vertical direction), the signal of the pixel readout shared control signal bus 209 is modified, and the readouts from the segmental pixels are controlled such that charge additions are carried out as described in FIG. 3B.

Then, in a horizontal drive period t4, the pupil-divided signals of the nth row in response to the pupil-division direction designation information are read out. Furthermore, in the horizontal drive period t4, the pupil-division designation information of the next (n+1)th row is held in the first buffer 205. By repeating the foregoing operation, readout processing of image signals within one vertical synchronizing interval is finished.

As described above, with the image sensor 103 according to the present embodiment, a left image or an upper image is outputted from the first output terminal 103-1 and a right image or a lower image is outputted from the second output terminal 103-2 in response to the inputted pupil-division direction designation information.

The pairs of pupil-divided image signals obtained from the image sensor 103 are inputted to the phase difference calculation unit 109, and also inputted to the signal addition processing unit 105, such that added image signals are generated for input to the camera signal processing unit 106 and the image analysis unit 107. That is, the signal addition processing unit 105 performs addition on the left image signals and right image signals or the upper image signals and the lower image signals outputted from the first output terminal 103-1 and the second output terminal 103-2, thereby generating the added image signals.

Figure 14:
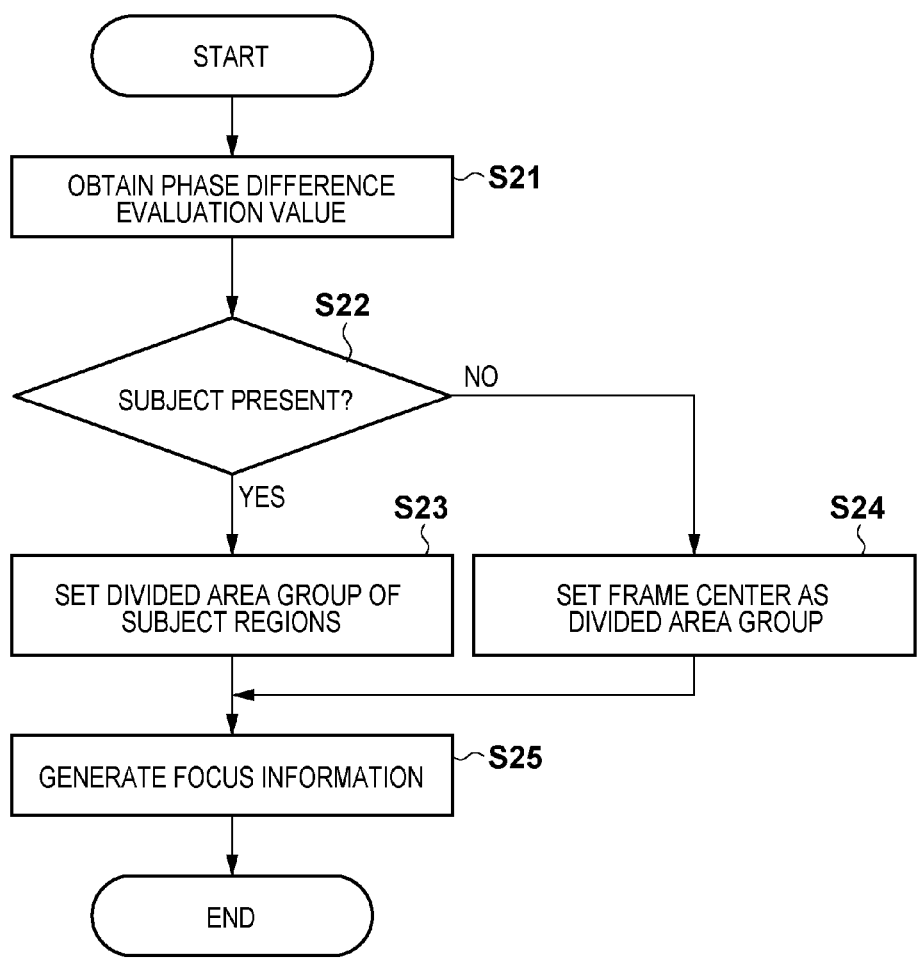
FIG. 14 is a flowchart showing a focus adjustment procedure.

Next, description is given of with reference to the flowchart in FIG. 14 regarding a focus information generation process according to the present embodiment.

First, in accordance with the pupil-division direction designation information inputted for each divided area outputted from the designation information generation unit 108, horizontal direction or vertical direction phase difference evaluation values are obtained by the phase difference calculation unit 109 for each divided area as described in FIG. 6 (step S21). Next, the presence/absence of a subject targeted for focus adjustments is checked (step S22). It should be noted that there are known subject detection processes such as face recognition for example as determination methods for the presence/absence of a subject targeted for focus adjustments. In subject detection processing, a determination of the presence/absence of a subject targeted for focus adjustments, as well as calculation of the position and size information of the subject are performed.

In a case where a subject targeted for focus adjustments is present (yes at step S22), based on the position and size information of that subject, the divided area group in which that subject is present is set as the divided areas to be used in obtaining focus information (step S23). On the other hand, in a case where a subject targeted for focus adjustments is not present, a divided area group that has been set in advance, such as the center of the frame or the like, is set as the divided areas to be used in obtaining focus information (step S24).

Then, the AF control unit 110 sets the largest value of the phase difference evaluation values of the divided area group that was designated at step S23 or step S24 as the information of the distance to the subject and calculates focus information.

As described above, according to the present embodiment, compared to a case where multiple photodiodes of each pixel of the image sensor 103 are read out separately, the system load can be reduced by decreasing by half the number of signals to be read out. Furthermore, the pupil-division direction can be changed for each divided area in response to the edge direction of the subject to output image signals, and therefore phase difference evaluation values can be obtained that are suited to the subject targeted for focusing, and the accuracy of focus adjustment control using the phase difference method can be improved.

It should be noted that in the above-described present embodiment, description was given in which all the pixels were the segmental pixels constituted by four photodiodes, but the present invention is not limited to this and, for example, the segmental pixels may be discretely arranged among ordinary pixels within the frame of the image sensor 103.

Furthermore, description was given regarding a case where the pupil-division direction was decided based on a determination result after determining whether or not the edge direction of the divided area was horizontal or vertical. However, the present invention is not limited to this, and the edge direction may be given by the values of the counter C0 and the counter C1, and the pupil-division direction may be decided based on these values.

Furthermore, the determination method of edge direction is not limited to the foregoing, and as long as the edge direction can be determined, any method may be used. And a pupil-division direction that enables effective phase differences to be obtained may be decided based on a degree of inclination of the edge direction. That is, the closer the edge direction is to horizontal, the pupil-division direction may be set to vertical, and the closer the edge direction is to vertical, the pupil-division direction may be set to horizontal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-015706, filed on Jan. 27, 2011 which is hereby incorporated by reference herein in its entirety.

What is claimed is:

1. An image capturing apparatus, comprising:
an image sensor having a plurality of segmental pixels each comprising a microlens, a plurality of photoelectric conversion units arranged in two-dimensions and corresponding to the microlens;
a controller configured to switching between a first readout mode and a second readout mode for obtaining a pair of image signals based on unprocessed output signals from the image sensor; and
a focus adjustment unit configured to carry out focus adjustment based on a phase difference of the pair of image signals acquired from the image sensor,
wherein, in the first readout mode, charges accumulated in a part of the plurality of photoelectric conversion units that is in a first section of each segmental pixel divided in a first pupil-division direction are added and readout, and in the second readout mode, charges accumulated in a part of the plurality of photoelectric conversion units that is in a second section of each segmental pixel divided in a second pupil-division direction are added and readout.

2. The image capturing apparatus according to claim 1, wherein all the pixels that constitute the image sensor are constituted by the segmental pixels.

3. The image capturing apparatus according to claim 1, wherein the image sensor is constituted by multiple pixels each including a single photoelectric conversion unit respectively, and the multiple segmental pixels arranged discretely.

4. The image capturing apparatus according to claim 1, further comprising an adder configured to add the pairs of image signals for each segmental pixel.

5. The image capturing apparatus according to claim 1, further comprising a determination unit configured to, based on an image signal of each pixel obtained from the charge/charges that has/have been read out from the image sensor, determine an edge direction of an image for each divided area of the image sensor divided into multiple areas.

6. The image capturing apparatus according to claim 5, further comprising a decision unit configured to, based on the edge direction that has been determined for each divided area by the determination unit, decide for each divided area either the first pupil-division direction or the second pupil-division direction.

7. The image capturing apparatus according to claim 6, wherein the controller switches between the first readout mode and the second readout mode based on the edge direction determined by the determination unit.

8. The image capturing apparatus according to claim 6, wherein the determination unit determines, as the edge direction, either a first direction perpendicular to the first pupil-division direction or a second direction perpendicular to the second pupil-division direction.

9. The image capturing apparatus according to claim 8, wherein the decision unit decides on the first pupil-division direction when the edge direction is the first direction and decides on the second pupil-division direction when the edge direction is the second direction.

10. The image capturing apparatus according to claim 6, wherein the decision unit decides on the first pupil-division direction when the edge direction is closer to horizontal than to vertical and decides on the second pupil-division direction when the edge direction is closer to vertical than to horizontal.

11. The image capturing apparatus according to claim 1, wherein the first section and the second section partially overlap each other.

12. A control method for an image capturing apparatus provided with an image sensor having a plurality of segmental pixels each comprising a microlens, a plurality of photoelectric conversion units arranged in two-dimensions and corresponding to the microlens, the method comprising:
    switching between a first readout mode and a second readout mode for obtaining a pair of image signals in accordance with unprocessed output signals from the image sensor; and
    carrying out focus adjustment based on a phase difference of the pair of image signals acquired from the image sensor,
    wherein, in the first readout mode, charges accumulated in a part of the plurality of photoelectric conversion units that is in a first section of each segmental pixel divided in a first pupil-division direction are added and readout, and in the second readout mode, charges accumulated in a part of the plurality of photoelectric conversion units that is in a second section of each segmental pixel divided in a second pupil-division direction are added and readout.

* * * * *